United States Patent
Dydyk et al.

(10) Patent No.: US 6,226,391 B1
(45) Date of Patent: *May 1, 2001

(54) FINGERPRINT CLASSIFICATION VIA SPATIAL FREQUENCY COMPONENTS

(75) Inventors: Robert Barry Dydyk, Newbury Park; Stuart A. Mills, West Hills; Phillip Wayne Dennis, Thousand Oaks, all of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/350,807

(22) Filed: Jul. 9, 1999

Related U.S. Application Data

(63) Continuation of application No. 08/899,803, filed on Jul. 24, 1997, now Pat. No. 5,953,442.

(51) Int. Cl.$^7$ ........................................ G06K 9/00
(52) U.S. Cl. .............................. 382/125; 382/211
(58) Field of Search ........................... 382/124, 125, 382/126, 127, 115, 116, 117, 118, 210, 211, 272, 278; 356/71

(56) References Cited

U.S. PATENT DOCUMENTS

| | | | |
|---|---|---|---|
| 4,047,154 | 9/1977 | Vitols et al. | 340/146.3 E |
| 4,083,035 | 4/1978 | Riganati et al. | 340/146.3 E |
| 4,135,147 | 1/1979 | Riganati et al. | 340/146.3 E |
| 4,151,512 | 4/1979 | Riganati et al. | 340/146.3 E |
| 4,246,568 | 1/1981 | Peterson | 340/146.3 E |
| 4,573,198 | 2/1986 | Anderson | 382/31 |
| 5,050,220 | 9/1991 | March et al. | 382/124 |
| 5,148,496 | 9/1992 | Anderson | 382/42 |
| 5,224,174 | 6/1993 | Schneider et al. | 382/124 |
| 5,311,359 | 5/1994 | Lucas et al. | 359/561 |
| 5,386,313 | 1/1995 | Szegedi et al. | 359/280 |
| 5,452,137 | 9/1995 | Lucas | 359/561 |
| 5,613,014 | 3/1997 | Eshera et al. | 382/124 |
| 5,631,971 | 5/1997 | Sparrow | 382/125 |
| 5,815,598 | 9/1998 | Hara et al. | 382/124 |

OTHER PUBLICATIONS

Soifer, et al., Fingerprint Identification Using the Directions Field, Proceedings of the 13th International Conference on Pattern Recognition, Vienna, Austria, Aug. 25–29, 1996, pp. 586–590.

Chen et al., Hybrid optical/digital access control using fingerprint identification, Optical Engineering, vol. 34, No. 3, Mar. 1995 (pp. 834–839).

*Primary Examiner*—Joseph Mancuso
*Assistant Examiner*—Vikkram Bali
(74) *Attorney, Agent, or Firm*—Price and Gess

(57) ABSTRACT

The present invention is a method and apparatus for automatically placing a first unknown image, such as an unknown fingerprint image, into one of a plurality of categories. The invention includes storing in a library a plurality of value series, each of which series is derived from the frequency representation of an image category. The categorization process and apparatus takes the frequency image of a first unknown pattern to create a first frequency image. The frequency image plane of the first (unknown) frequency image is divided into a plurality of frequency image plane regions. Each of the frequency image plane regions may be an angular segment radiating from the origin of the frequency image plane. A region value is assigned to each of the frequency image plane regions based on the total energy in the frequency image in that region. The region values for the first frequency image are combined to generate a first series of region values. The first series of region values is compared in a comparator with each of the stored value series. The comparator preferably performs a correlation function on the pattern or series of the regional values using the one dimensional frequency transform of the spatial representation of the pattern of series of regional values.

17 Claims, 9 Drawing Sheets

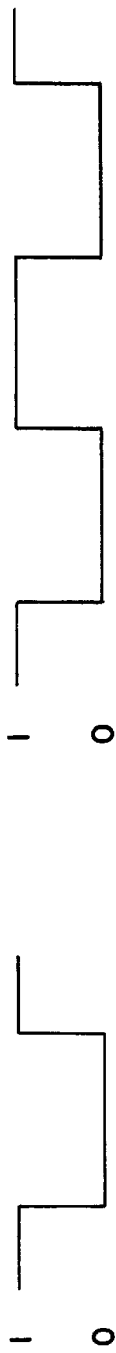
FIG. 8a
FIG. 8b
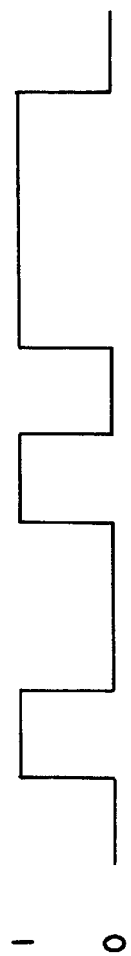
FIG. 9
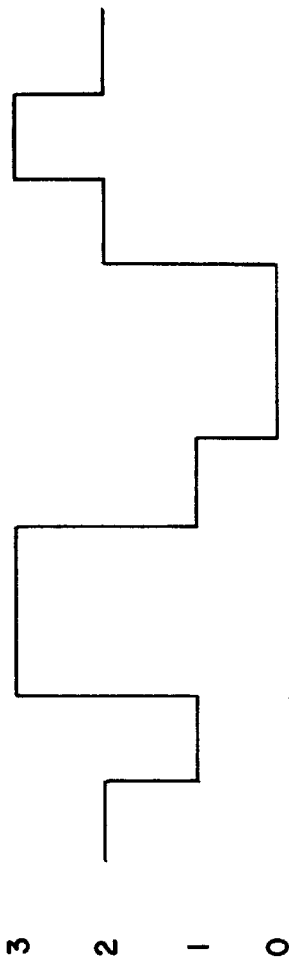
FIG. 10

FINGERPRINT CLASSIFICATION VIA SPATIAL FREQUENCY COMPONENTS

The present application is a continuation of United States Utility patent application Ser. No. 08/899,803, filed Jul. 24, 1997, now U.S. Pat. No. 5,953,442, entitled FINGERPRINT CLASSIFICATION VIA SPATIAL FREQUENCY COMPONENTS, naming as inventors Robert Barry Dydyk, Stuart A. Mills, and Phillip Wayne Dennis.

CROSS-REFERENCE TO RELATED APPLIATIONS

Not Applicable

STATEMENT REGARDING FEDERALLY SPONSORED RESEARCH OR DEVELOPMENT

Not Applicable

BACKGROUND OF THE INVENTION

The present invention relates generally to categorizing and matching complex images or patterns, such as fingerprint patterns. In particular, the present invention relates to automatically placing such patterns into predetermined categories for use in matching and identifying the patterns.

The present invention is particularly useful to automatically classify fingerprint patterns into categories to aid in matching such fingerprint patterns. The present invention is discussed herein in the context of a device and method for analyzing fingerprint images. However, those familiar with image processing will recognize that the invention may be applied to analyzing any image.

A fingerprint pattern is the pattern of ridges at the tip of a person's fingers. Each fingerprint is unique. No two individuals have the same fingerprints. Therefore, fingerprints may be used to identify particular individuals by matching fingerprint patterns.

For example, one use of fingerprint matching is to verify the identity of an individual, such as when granting access to a controlled building or area. The individual's fingerprint patterns may be compared against a stored set of fingerprint patterns to verify that the person seeking access is actually the person for whom access has been authorized.

Another use for fingerprint pattern matching is to establish the likely identity of a person who has a particular fingerprint pattern. This use is often employed in criminal investigations. Contact between a person's fingers and an object may leave a replica of the person's fingerprint pattern on the surface of the object. If a fingerprint pattern found on an object can be matched with a fingerprint pattern of a known individual, then it is virtually certain that individual touched the object on which the fingerprint pattern was found.

Thus, when a fingerprint pattern is detected at a location of a crime, the police often want to establish the identity of the person possessing that fingerprint pattern. However, establishing that identity requires comparing the unknown fingerprint with the fingerprints that are already stored on file.

That comparison process is extremely complex and time consuming. There may be a significant number of individuals whose fingerprint patterns are on file. In addition, each finger has its own fingerprint pattern. Therefore, comparing a particular fingerprint pattern with a stored collection of fingerprint patterns may require comparing the unknown fingerprint pattern with up to ten fingerprints in each of potentially millions of stored records.

Because of the value in establishing the identity of a person with a particular fingerprint pattern, and the complexity of the comparison process, various techniques have been developed to attempt to simplify the comparison process.

The earliest simplification was to establish three categories of fingerprint patterns. Each fingerprint pattern can be classified into one of these categories. These categories are based on the appearance of the fingerprint pattern. They are the loop category, the whorl category, and the arch category. Using such categories, the search for an individual possessing a particular fingerprint pattern is somewhat simplified. If the unknown fingerprint pattern is of a whorl type, then only the whorl patterns on file need to be compared. However, with only three categories, there still may be millions of fingerprint patterns on file (reference patterns) to compare with the unknown pattern. This categorization technique remains widely used.

Several techniques for automating the process of comparing fingerprint patterns have been developed. Current techniques compare the fingerprint images directly. Some techniques compare specific features of the fingerprint patterns, such as the minutiae. A fingerprint comprises a pattern of ridges and valleys, and minutiae. Minutiae are the points at the end of the ridges.

One technique for comparing the fingerprint pattern minutiae compares the locations of the minutiae in the X-Y plane of the fingerprint pattern. While this technique is straightforward, a disadvantage of this technique is that the unknown print and the reference print must be carefully aligned for proper comparison. Such alignment may be particularly difficult if the unknown print is only a portion of the complete fingerprint pattern. In addition, this technique is susceptible to errors if the fingerprints being compared were taken under different circumstances. Consider the circumstance when two fingerprint images made by the same finger are being compared. If greater pressure was applied to the finger when making one print than when making the other, the minutiae may be in different places, and the relationship among the minutiae may differ. The minutiae may be spread farther apart in the fingerprint pattern made using greater pressure. Finally, this technique requires that the reference fingerprint image and the unknown fingerprint image be identical in size.

Another technique for comparing minutiae patterns is to compare the relative angles of the ridges associated with the minutiae. This technique lessens errors due to X-Y displacement. However, this technique is rotationally sensitive. Because an unknown fingerprint pattern may be only a partial print, the rotational orientation of the fingerprint pattern may be uncertain. In addition, this technique may be sensitive to changes in minutiae orientation that may arise when the fingerprints being compared were taken under different circumstances.

Yet another technique for comparing minutiae is to compare minutiae within each of several small regions of the fingerprint pattern. By using relatively small areas of the fingerprint, this technique limits the effect of the minutiae spreading when greater pressure is applied to the finger when making the fingerprint. By examining small regions of the fingerprint, the distortions in the fingerprint pattern due to spreading from different finger pressure when making the print are less pronounced. However, the problems of minutiae spreading are not completely eliminated. In addition, this technique is still rotationally sensitive, and the patterns must be aligned to identify the individual regions for comparison.

The above automatic fingerprint matching techniques are directed to matching specific fingerprint patterns. In addition to the difficulties noted above, each of those automatic matching techniques requires a very large amount of computational effort. Such large efforts require large computers and/or substantial time to perform.

Different pattern recognition techniques have been applied to matching other, simpler, types of patterns. For example, techniques have been developed to compare an unknown object with a library of reference patterns. Such techniques have been developed for object recognition systems, for automatically recognizing objects such as trucks, tanks, or particular types of ships or aircraft.

One pattern recognition technique used in connection with such patterns is to use a Fourier image or frequency representation in comparing the image of an unknown object with each of several stored images, each of which corresponds to a particular object. For example, there may be an interest in identifying whether an unknown aircraft is an airplane or a helicopter. The images of one or more known airplanes and one or more known helicopters are stored in a computer. The image of the unknown aircraft is correlated with the stored images to identify the closest fit. This correlation can be accomplished with Fourier transforms, as will be understood by those skilled in the image processing arts.

The pattern recognition technique last described above compares the representations of the objects. The process has proved quite effective when comparing relatively simple patterns, and when comparing a relatively small number of different patterns. However, this technique has not been successfully applied to identifying complex patterns such as fingerprint patterns.

As noted above, fingerprint patterns are extremely complex. Therefore, the calculations involved in correlating such patterns are very complicated, and require a substantial amount of computational capability. In addition, when comparing an unknown fingerprint with fingerprints on file, a very large number of fingerprint patterns must be compared. Therefore, the last described technique becomes difficult and time consuming for comparing an unknown fingerprint pattern with fingerprint patterns on file.

It is an object of the present invention to simplify the process of matching an unknown fingerprint to a database of fingerprint patterns.

It is an object of the present invention to reduce the number of stored fingerprint patterns with which a detailed comparison of an unknown fingerprint must be made.

It is an object of the present invention to automatically classify complex patterns, such as fingerprint patterns, into predetermined categories.

It is an object of the present invention to automatically classify fingerprint patterns into appropriate ones of a large number of categories of fingerprint patterns.

It is an object of the present invention to automatically classify fingerprint patterns regardless of the spatial alignment of the fingerprint.

It is an object of the present invention to automatically classify fingerprint patterns regardless of the angular orientation of the fingerprint.

It is an object of the present invention to automatically classify fingerprint patterns regardless of the size of the fingerprint.

SUMMARY OF THE INVENTION

The present invention is a method and apparatus for automatically placing a first unknown image, such as a fingerprint image, into one of a plurality of categories. The present invention generates a frequency representation of the fingerprint image. The frequency representation is sampled on the basis of the energy in disjoint regions of the frequency representation, to generate a set of region values. A representation of the sets of region values is generated. This spatial representation is correlated with each of a plurality of stored representations, each corresponding to a predetermined fingerprint category.

To categorize an unknown image, the invention includes storing in a library a plurality of representations of value series, each of which series is representative of the frequency image of an image category. The categorization process and apparatus takes a frequency image of a first unknown pattern to create a first frequency image. The resultant frequency plane of the first frequency image is divided into a plurality of frequency image plane regions. Each of the frequency image plane regions may be an angular segment radiating from the origin of the frequency image plane. A region value is assigned to each of the frequency image plane regions based on the amount of frequency image energy in that region. The region values for the first frequency image are combined to generate a first series of region values. The first series of region values is compared in a comparator with each of the stored value series. The comparator preferably encodes the first series of region values into a spatial image, and correlates that spatial image with the spatial images corresponding to each of the stored value series.

In a preferred method of placing a first unknown fingerprint into one of a plurality of categories, the method includes storing a plurality of representations of fingerprints, each of which is representative of a fingerprint category. That storing step comprises, for each of a plurality of representative fingerprints, taking the two dimensional frequency image of a representative fingerprint for each fingerprint category, and dividing the image plane of the frequency image into a plurality of regions. A region value is assigned to each of the image plane regions based on the energy present in the frequency image in that region. The region values for the first frequency image are combined to generate a representative fingerprint value series. A spatial representation of the representative fingerprint value series is generated. A one dimensional frequency representation of the spatial representation of the representative fingerprint value series is generated. The one dimensional frequency representation is stored. According to the invention, the two dimensional frequency image of a first unknown fingerprint is taken, to create a first unknown frequency image The image plane of the first unknown frequency image is divided into a plurality of regions. A region value is assigned to each of the image plane regions based on the energy present in the first unknown frequency image in that region. The region values for the first unknown frequency image are combined to generate a first unknown fingerprint value series. A spatial representation of the first unknown fingerprint value series is generated. A one dimensional frequency representation of the spatial representation of the first unknown fingerprint value series is generated. The one dimensional frequency representation is correlated with each of the stored one dimensional frequency representations representative of the different fingerprint categories.

BRIEF DESCRIPTION OF THE FIGURES

FIG. 3b is a three dimensional depiction of the energy in the Fourier transform (the diffraction pattern) of the pattern of FIG. 3a.

FIG. 4b is a three dimensional depiction of the energy in the Fourier transform (the diffraction pattern) of the pattern of FIG. 4a.

FIG. 5b is a three dimensional depiction of the energy in the Fourier transform (the diffraction pattern) of the pattern of FIG. 5a.

FIG. 6a is a two dimensional image of the transform plane of the Frequency image of the fingerprint image shown in FIG. 2a.

FIGS. 8(a)–(b) shows a graphical representation of the pattern of region values of the simplified transform image of FIG. 7.

FIG. 9 shows a graphical representation of a different exemplary pattern of regional values for a transform image.

FIG. 10 shows a graphical representation of a third exemplary pattern of regional values for a transform image.

DETAILED DESCRIPTION

Overview

Figure 1:
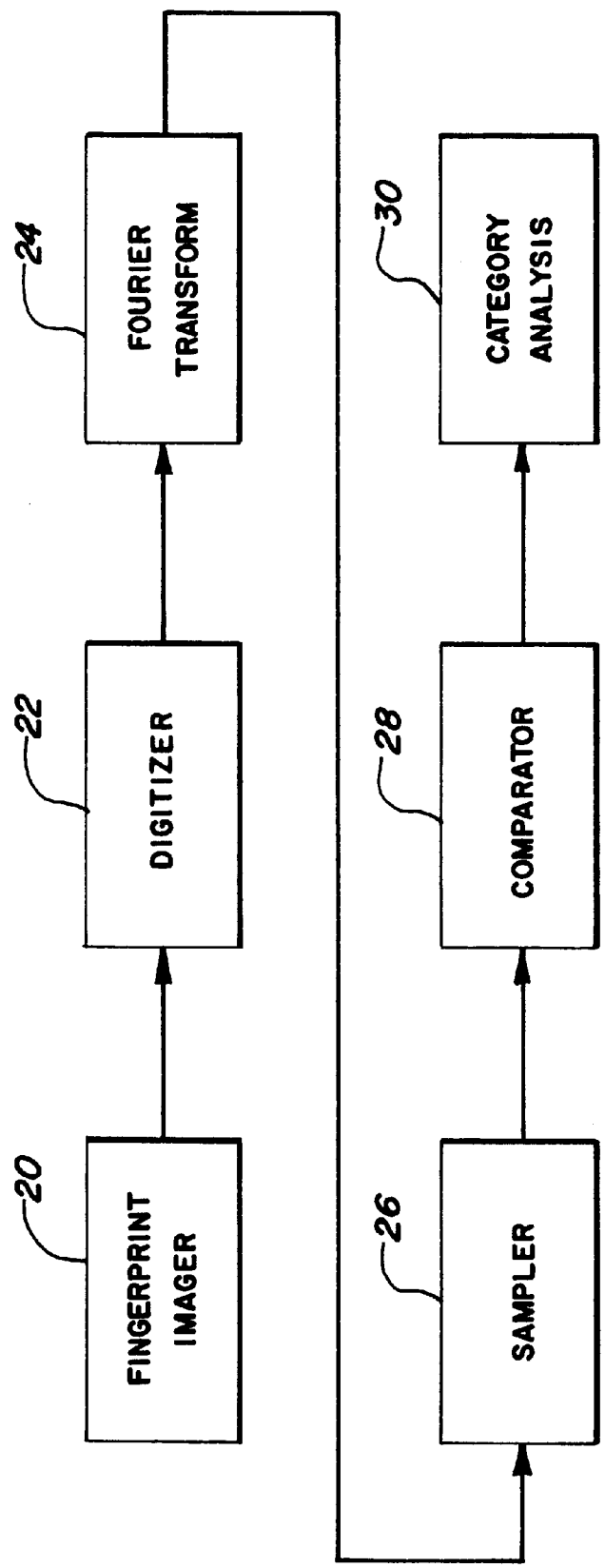
FIG. 1 shows a block diagram of a fingerprint classifier incorporating the present invention.

FIG. 1 is a block diagram of a fingerprint pattern classifier incorporating the present invention.

The fingerprint image is created using any of the conventionally available fingerprint imager devices 20. The initial image may be taken from a ink impression placed on paper. An optical image or photograph of the inked image may then be taken. Alternatively, the image may be taken optically by pressing the finger onto a glass plate.

The image is preferably digitized for ease of processing in modern digital image processing equipment. The digitizing may be performed by an image digitizer 22.

Frequency image apparatus 24 generates a frequency image or representation of the digitized fingerprint image. The frequency image apparatus 24 converts or transforms the digitized fingerprint image from the spatial domain into the frequency domain. The frequency imager 24 may use the Fourier transform to generate that frequency representation.

A sampler 26 samples the frequency domain image. The sampler 26 divides the frequency image plane of the frequency domain image of the fingerprint into a plurality of regions. The sampler 26 then assigns a region value to each of the frequency image regions, based on the energy in the frequency domain image in that region.

A comparator 28 compares the pattern or series of region values of the frequency domain image of the fingerprint pattern with each of several sets of representative sets of regional values. Each representative pattern of region values is stored in a library and corresponds with a representative fingerprint for a particular category or classification of fingerprint. This comparison may be performed by correlating the region value pattern derived from the Fourier transform of the unknown fingerprint with the representative region value pattern. The comparator may generate a spatial representation of the series of region values, and then generate a one dimensional frequency representation of that spatial representation. The comparator 28 may then compare that one dimensional frequency representation with stored one dimensional frequency representations, each of which corresponds to the series of region values representing a category of fingerprint patterns.

A category analysis computer 30 identifies the "best fit" of the comparisons performed in the comparator 28. Those familiar with the art will recognize that in certain circumstances, the category analysis computer 30 and the comparator 28 may be the same computer apparatus.

Fingerprint Patterns

FIG. 2 shows three exemplary fingerprint patterns. Each fingerprint pattern comprises a plurality of ridges and valleys between the ridges. At each point in the fingerprint pattern the ridges have a particular directional orientation, and particular frequency (ridges per inch). As each fingerprint pattern has a unique pattern of ridges, the combination of the spatial frequencies and their orientations is unique for each fingerprint.

Using the present invention, the frequency domain is used to classify fingerprint patterns into predetermined categories. In particular, a frequency representation of the fingerprint pattern is used to classify the fingerprint pattern.

Because a fingerprints ridges occur in frequencies (ridges per inch) and orientations, the frequency image of the fingerprint pattern has useful information relating to the fingerprint pattern. The frequency image or representation may be generated using the Fourier transform of the fingerprint image.

To generate the frequency image, a portion of the Fourier transform of the fingerprint image may be used. As is understood by those familiar with Fourier transforms, the Fourier transform takes a spatial image having x and y components, and converts it to a frequency image having magnitude and phase information. For the present apparatus and method, the magnitude portion of the transform is used.

Fourier transforms are well understood. Numerous references are available that discuss the principles of Fourier transforms. One such reference is Gonzalez and Wintz, *Digital Image Processing,* Addison-Wesley Publishing Company (1977) (particularly Chapter 3).

Figure 3C:
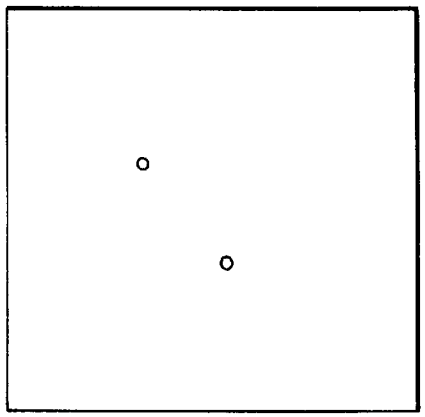
FIG. 3c is a two dimensional image of the frequency plane of the pattern shown in FIG. 3b.
Figure 3B:
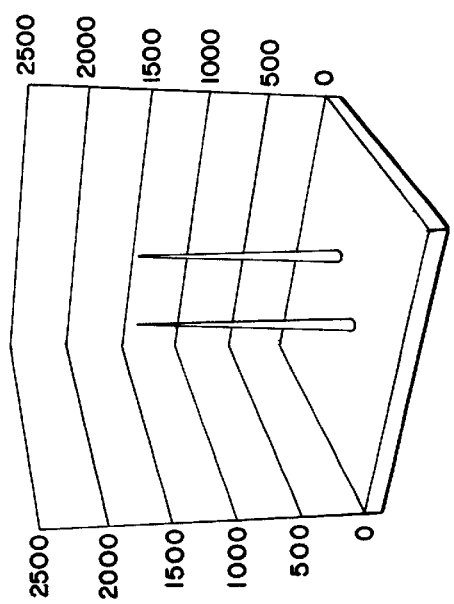
Figure 3A:
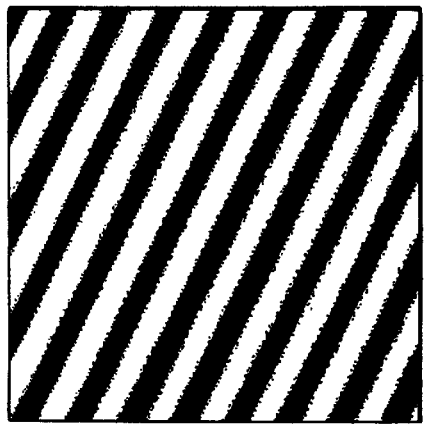
FIG. 3a shows a simplified pattern of what might be a portion of a fingerprint.

FIG. 3a shows a simplified pattern of what might be a portion of a fingerprint. This portion of the fingerprint pattern constitutes a series of ridges and valleys having a particular directional orientation. FIG. 3b is a three dimensional depiction of the energy in the frequency representation of the pattern of FIG. 3a. FIG. 3c is a two dimensional image of the frequency image plane of the representation shown in FIG. 3b.

In the simplified pattern shown in FIG. 3a, the ridges have a uniform frequency and orientation. Therefore, the frequency image is simply two peaks. Each peak has a magnitude, and a location in the frequency representation plane. Only one of the peaks is significant, since the frequency image of a real input is symmetric about the origin. Those familiar with frequency imaging will note that black and white have been reversed in FIGS. 3b, 3c, 4b, 4c, 5b, and 5c from that which is conventionally used, to aid in illustrating the present invention.

The location of the transform peaks indicate both the frequency of the ridge pattern, and the orientation of the ridge pattern. As is understood by those familiar with Fourier transforms, as the frequency of the ridge pattern increases the peaks of the transform move toward the edge of the transform plane. Conversely, as the ridge frequency decreases (the ridges are spaced farther apart) the peaks of the frequency representation move toward the center of the frequency image plane. At the center of the frequency image plane is the origin of the frequency image plane, where the x and y axes meet. The movement of the peak toward the edge of the plane as the frequency increases and toward the center of the plane as the frequency decreases occurs independently in both the x-axis projection and the y-axis projection. This occurs because the two dimensional frequency representation is separable. Thus, when the input pattern is rotated, the frequency transform peak is rotated on the transform plane. Thus, the transform has new frequency projections on the x and y axes.

Figure 4C:
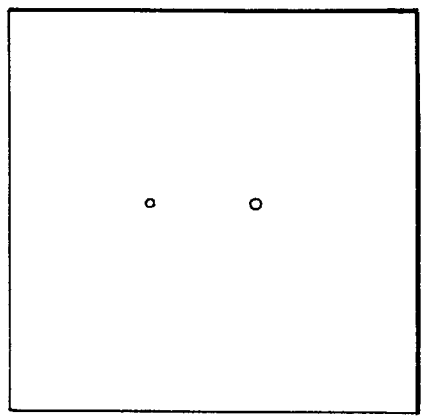
FIG. 4c is a two dimensional image of the frequency plane of the pattern shown in FIG. 4b.
Figure 4B:
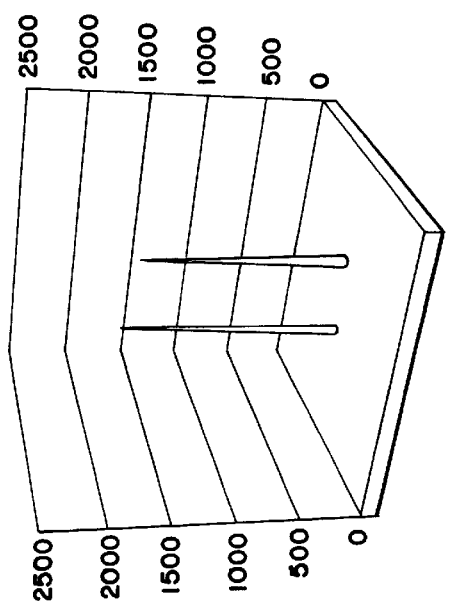
Figure 4A:
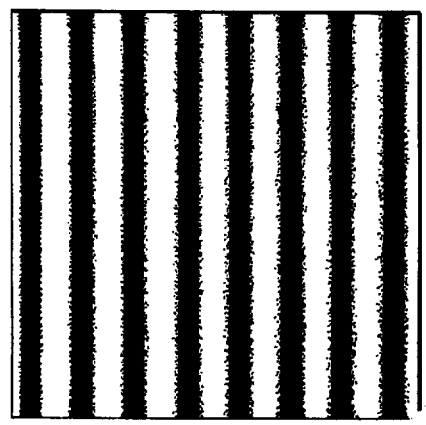
FIG. 4a shows a simplified pattern of what might be a portion of a fingerprint.

FIG. 4a shows a simplified pattern of what might be a different portion of a fingerprint pattern. The orientation of the ridges of the pattern of FIG. 4a differs from the orientation of the ridges of the pattern of FIG. 3a. Consequently, the peak of the frequency image, as shown most clearly in the two dimensional image of the frequency image plane shown in FIG. 4c, is rotated relative to the peaks shown in the frequency image plane shown in FIG. 3c. However, it is noted that the frequency of the ridges in the pattern shown in FIG. 4a is the same as the frequency of the ridges in the pattern shown in FIG. 3a. Therefore, the frequency image peak in FIG. 4c is the same distance from the origin of the frequency plane as the frequency image peak shown in FIG. 3c.

Figure 5C:
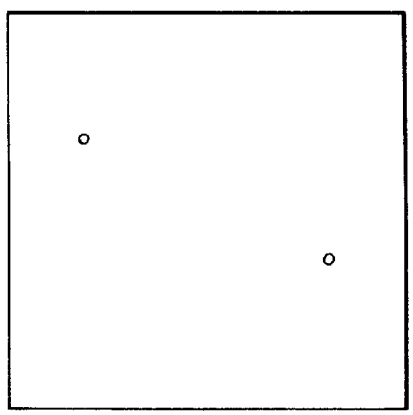
FIG. 5c is a two dimensional image of the frequency plane of the pattern shown in FIG. 5b.
Figure 5B:
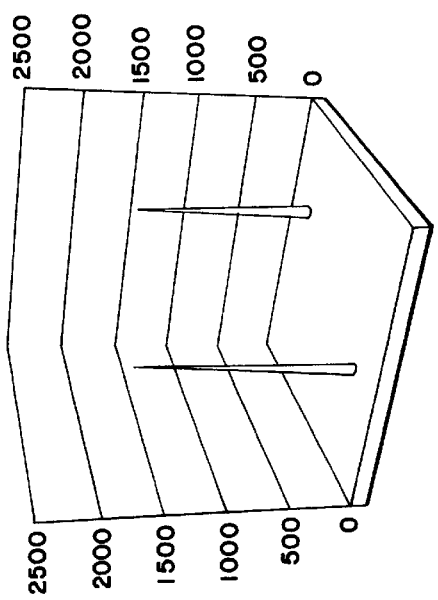
Figure 5A:
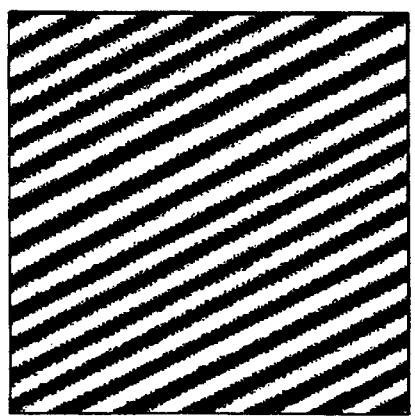
FIG. 5a shows a simplified pattern of what might be a portion of a fingerprint.

FIG. 5a shows a simplified ridge pattern in which the ridges are closer together than the patterns shown in FIGS. 3a and 4a. Thus, the frequency of the ridges in the pattern of FIG. 5a is higher than the frequency of the pattern of ridges in FIGS. 3a and 4a. Consequently, the peak of the frequency image function is farther from the origin of the frequency image plane, and closer to the edge of the frequency image plane, as is seen in FIG. 5c. In addition, the orientation of the ridge pattern shown in FIG. 5a differs from that of either the pattern of FIG. 3a or that of the pattern of FIG. 4a. Thus, the peak of the frequency representation shown in FIG. 5c is rotated on the frequency image plane relative to the peak of the frequency representation shown in FIG. 3c, and also with respect to the frequency representation shown in FIG. 4c.

Digitizing Fingerprint Images

The digitizer 22 converts the fingerprint image to a digital image. Digital images may be easily processed using current digital computer equipment. The image may be converted to a digital image consisting of, for example, 256×256 individual pixels, or 512×512 individual pixels.

To avoid ambiguity generated by, or arising from, shades of gray that may appear in the fingerprint image, the fingerprint image is preferably converted to a pure black and white, or binary, image. So creating a binary image to be transformed, improves the signal to noise function in the frequency domain. The conversion to a binary image may be performed using conventional adaptive thresholding algorithms. The conversion of the gray scale image to a binary or black and white image may also be performed by the digitizer 22. The techniques and methods for doing so are well understood in the image processing arts.

A fingerprint image is commonly taken by applying black ink to the fingertip and pressing the inked fingertip onto white paper. Using that technique, the ridges of the fingerprint pattern appear as black on a background of white, leaving a large amount of white paper around the perimeter of the fingerprint pattern.

The frequency representation imager 24 (described below) is likely to interpret significant areas of white as regions of low frequency images, which will cause a large peak to appear in the frequency image function at and around the origin of the frequency image plane. Such a large peak at the center of the frequency image plane may interfere with the analysis of the higher frequency information that appears on the plane. Therefore, it is desirable to invert the original fingerprint image from black on white to white on black. In the inverted image, the ridges of the fingerprint pattern appear white, and the valleys appear black. The fingerprint images of FIG. 6 have been inverted in this manner. This image inversion may be performed by the image digitizer 22.

Nevertheless, the fingerprint image is still likely to have significant portions that could be interpreted as low frequency patterns. These portions are more a function of the characteristics of imaging and printing processes than of the actual fingerprint. Such portions will create a high peak in the frequency image at the origin. Such a peak may distort the analysis of the higher frequency information, which is the information of interest.

To eliminate this peak at the origin of the frequency transform image, the fingerprint image may be normalized. In normalization, the image is processed to produce an image in which the net energy of the frequency image is zero.

Transforms of Fingerprint Patterns

Of course an actual fingerprint is much more complex than the patterns shown in FIGS. 3a, 4a, and 5a. This is apparent by observing the actual fingerprint patterns shown in FIGS. 2a, 2b, and 2c. Nevertheless, the frequency image of the actual fingerprint pattern may be taken, and certain characteristics of the frequency transform may be noted.

The frequency image of the fingerprint image is generated by a frequency representation imager 24. The digitized fingerprint image from the digitizer 22 is input to the frequency representation imager or frequency transformer 24. Different types of transform imagers are available. Such apparatus may use optical imaging to generate the frequency image. A portion of the optical image processing system shown in U.S. Pat. No. 4,573,198, issued to Robert H. Anderson, provides optical imaging to create a frequency domain image of a spatial image. See particularly the Background section of that reference.

Figure 2C:
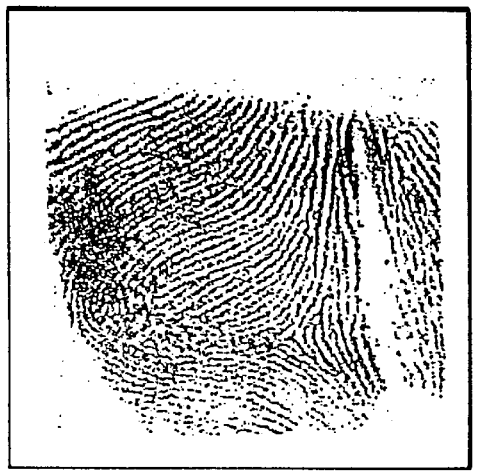
FIGS. 2(a)–2(c) shows three exemplary fingerprint patterns.
Figure 2B:
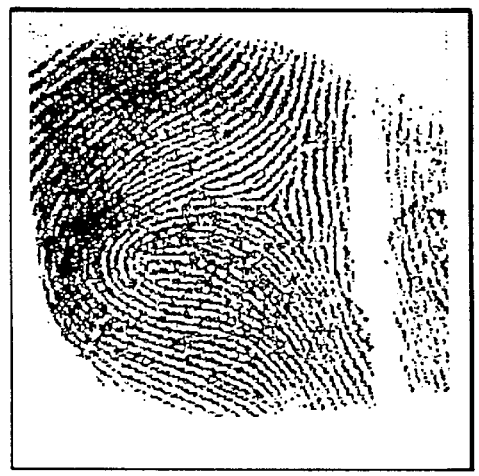
Figure 2A:
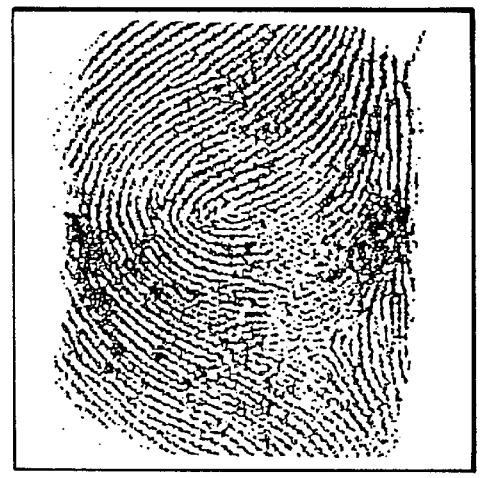
Figure 6A:
Figure 6B:
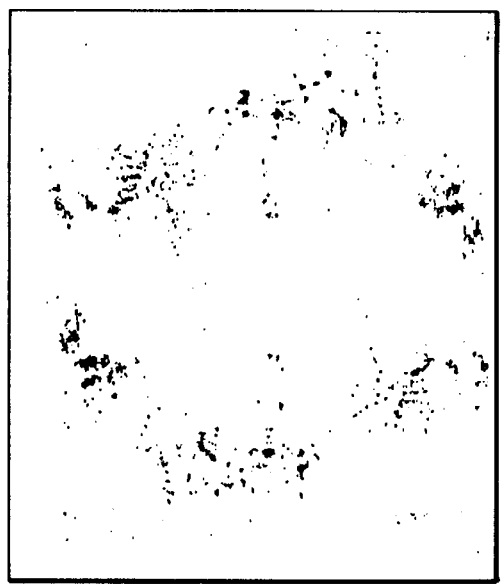
FIG. 6b is a two dimensional image of the transform plane of the Frequency image of the fingerprint image shown in FIG. 2b.
Figure 6C:
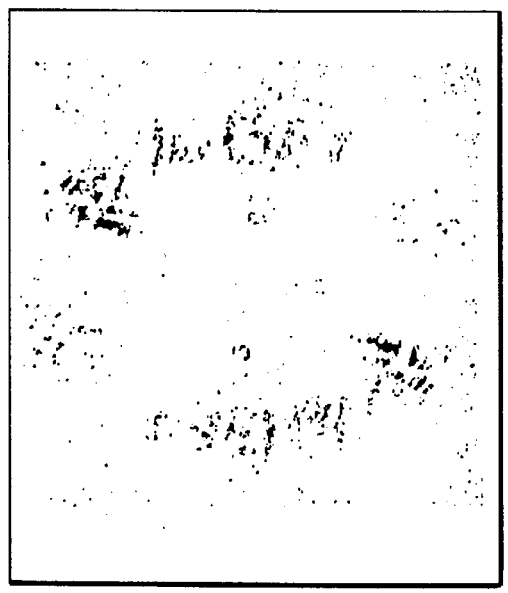
FIG. 6c is a two dimensional image of the transform plane of the Frequency image of the fingerprint image shown in FIG. 2c.

FIGS. 6a, 6b and 6c show frequency image representations of the actual fingerprint images shown in FIGS. 2a, 2b and 2c, respectively. The frequency representation of the fingerprint image shown in FIG. 2a is shown in FIG. 6a. Similarly, the frequency representation of the fingerprint image shown in FIG. 2b is shown in FIG. 6b. The frequency representation of the fingerprint image shown in FIG. 2c is visible in FIG. 6c.

If the input fingerprint image has not been normalized, the energy peak at the origin of the transform plane may be eliminated by "zeroing out" the central portion of the transform or frequency image plane. For example, a region containing the origin may be "zeroed out." In many circumstances it may be simpler to eliminate the frequency image at the origin than to process the original image sufficiently that the peak is not produced.

As noted above, the peaks of the frequency representations are symmetric about the origin (a straight line drawn through the origin will have equal values on both sides of the line). In referring to FIG. 6a, the frequency image of the fingerprint image shown in FIG. 2a shows this symmetry. The same patterns that appear in the second quadrant of the frequency plane also appear in the fourth quadrant. Similarly, frequency energy peaks that appear in the first quadrant of the frequency plane also appear in the third quadrant. Thus, only one half the frequency image plane needs to be analyzed. For the following discussion, the portion of the frequency image plane above the x axis will be examined.

Referring to the fingerprint image shown in FIG. 2a, it is apparent that the majority of the ridge lines are diagonal. Thus, in the frequency image representation of that fingerprint image, shown in FIG. 6a, the transform energy peaks cluster near the corners of the frequency plane, away from the axes.

Examination of the fingerprint pattern shown in FIG. 2b shows that the ridges of the fingerprint pattern are more vertical than are the ridges of the fingerprint pattern shown in FIG. 2a. Thus, the frequency representation of the fingerprint pattern shown in FIG. 2b, which is shown in 6b, has clusters of energy peaks closer to the x-axis than does the frequency representation shown in FIG. 6a. Additional clusters of energy peaks in the frequency representation shown in FIG. 6b at the y-axis indicate substantially horizontal ridges in the fingerprint image of FIG. 2b. These horizontal components can be seen near the bottom of the fingerprint image shown in FIG. 2b.

As can be seen by examining the fingerprint image of FIG. 2c, the orientations of the ridges are much more distributed at different angles. Thus, the frequency representation shown in FIG. 6c is much more distributed on the frequency plane. However, there is one very strong diagonal component to the fingerprint image shown in FIG. 2c. Thus, there is a corresponding strong collection of frequency energy peaks in the second and fourth quadrants of the frequency plane.

As can be seen by comparing FIG. 2a with FIG. 6a, FIG. 2b with FIG. 6b, and FIG. 2c with FIG. 6c, the ridges within a particular fingerprint pattern are of a substantially uniform spacing or frequency. Therefore, the frequency representation of each fingerprint image tends to cluster at a substantially uniform distance from the origin of the frequency image plane.

Sampling

In accordance with the present invention, the frequency image is sampled. To do so, the sampler 26 divides the frequency image plane into a plurality of frequency image plane sections or regions. The information contained in each region of the frequency representation is quantified to generate for each region a region value. The individual regional quantities or values are combined to produce a pattern of regional values. This pattern of values can then be compared with a plurality of representative patterns, each of which represents a particular fingerprint classification category. From this comparison, a "best fit" match can be determined for classifying the fingerprint under examination.

In a preferred embodiment of the present invention, the frequency image plane is divided into a plurality of angular regions. These angular regions may each encompass an arc as small as 1 degree, or even smaller. Again, since the frequency image is symmetric about the origin, only one half of the frequency image needs to be analyzed. Therefore, using a 1 degree angular region produces 180 regions to be analyzed in the transform plane. In certain applications, because of computational challenges associated with analyzing 180 regions, it may be beneficial to divide the half plane of the frequency image plane into approximately 20 to 40 regions. In that case, with angular regions, each region would encompass an arc of between 9 degrees and 4.5 degrees. The angular regions are preferably equal in size.

Smaller frequency image regions provide greater numbers of regions. With a greater number of regions, each producing its regional value, the string of regional values becomes longer. Those longer value patterns allow a finer degree of discrimination among patterns, by providing more categories or classes into which to place each pattern. However, the smaller regions increases the probability that two fingerprints made at different times from the same finger may be classified differently because of variations in the fingerprint pattern due to different circumstances under which they are taken.

Figure 7:
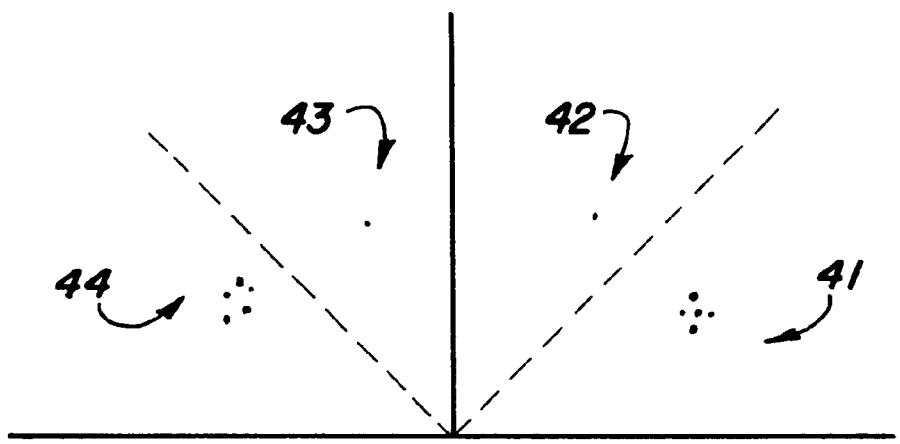
FIG. 7 is a simplified diagram of a two dimensional transform of a fingerprint image.

For exemplary purposes only, a highly simplified frequency image is shown in FIG. 7. To further simplify the description, the half plane above the x-axis is divided into four regions only, instead of the recommended 20 to 40 or more regions. Each region in the simplified image of FIG. 7 therefore represents a 45 degree arc or angular portion of the frequency image plane. A different value can be assigned to each angular region of the frequency image plane based on the information represented by the energy that appears in that region of the frequency image.

For example, the energy in the region may be examined. The energy in a particular arc or angular region of the transform plane is indicative of the number of ridges having a particular orientation in the fingerprint pattern.

By using angular regions of the frequency image, the comparison process may compare fingerprints of different sizes. As noted above, the closer the ridges of the fingerprint pattern are to one another, the farther from the origin the frequency image elements are. A smaller image of the fingerprint will produce a frequency image that has elements farther from the origin of the frequency image plane. Thus, the size of the fingerprint image is related to the distance from the origin of the frequency image. However in analyzing the total normalized energy in an angular region, the size of the original fingerprint image is irrelevant.

In addition, the distance of each energy peak from the origin of the frequency plane may be determined and analyzed, if it is not necessary to compare fingerprint images of different sizes. As noted above, the distance an energy peak is from the origin of the frequency plane indicates the frequency of the ridges in the fingerprint image. The farther from the origin of the frequency plane the peak is, the higher the ridge frequency. Higher ridge frequency indicates that the ridges are closer together. However, it appears that the ridge frequency or ridge spacing is not a particularly useful discriminator among fingerprints. Not a great deal of variation among the ridge frequency is observed among different fingerprints. Furthermore, because different pressure may be applied when making a fingerprint using the same finger, relying on the distance between ridges (and the resulting ridge frequency) may undesirably place two fingerprints applied by the same finger in different categories. This arises because one application of a fingerprint may be made using substantial pressure, which may cause the fingerprint to spread out. The spreading causes the ridges to be separated by a greater amount than a fingerprint made by the same finger using lesser pressure.

The clustering of frequency energy, or energy peaks in the frequency representation in a particular angular region of the frequency plane, however, does provide useful information for classifying fingerprints. As is evident from the preceding information, a clustering of frequency energy peaks, or concentration of frequency image energy, in a particular region indicates that the ridges in the fingerprint image tend to have a particular orientation. Therefore, the quantity of energy in each particular region is useful in providing a manner of discriminating among fingerprint categories. The energy in a particular region also provides information about the extent to which the ridges of a particular orientation dominate or are present in the basic fingerprint image.

A regional value is determined by examining the energy in each region of the frequency plane. Each energy peak has a magnitude. The total magnitude of all the energy peaks in the region may be determined. That total may be the regional value. The regional value is representative of the concentration of the energy in the region. That in turn is indicative of the extent to which the fingerprint image possesses ridges having a particular orientation.

The regional value assigned to each region of the transform plane is generally digitized. For example, the regional value may be binary, using a single digitizing threshold. Alternatively, up to a virtually unlimited number of thresholds may be used to provide a wide range to the digital values available for the regional values.

For the simplicity of the present discussion, a binary discrimination for the regional values will be considered. The following discussion will refer to the simplified transform representation shown in FIG. 7, which is highly simplified, and includes far fewer frequency plane regions than would be used in an actual implementation. Referring to FIG. 7, it is seen that there are energy peaks in each of the four angular regions 41, 42, 43, 44. It will also be assumed for simplicity that each of these energy peaks has substantially the same magnitude. Such peaks indicate that the fingerprint image has at least some ridges in virtually all orientations. Consistent with the frequency images shown in FIGS. 6a, 6b, and 6c, the frequency points in the simplified transform plane shown in FIG. 7 are clustered at substantially the same distance from the origin of the frequency image plane. This clustering indicates that the ridges have a substantially uniform spacing, yielding a similar frequency among the different ridges.

There are significantly more energy peaks in regions 41 and 44 than there are in regions 42 and 43. The total energy in each of the regions 41 and 44 of the frequency image is greater than the total energy in the regions 42 and 43. This clustering of energy in the regions relatively nearer the x-axis of the frequency image plane indicates that the fingerprint of which this is a frequency representation has more ridges that are closer to vertical than ridges that are close to horizontal.

A regional value may be assigned to each region of the frequency image plane to signify the number and magnitude of frequency energy peaks within that region. The total energy represented by all the energy peaks in the region is determined. To establish a binary value for each region, a thresholding algorithm may be applied to the energy level in each region. Thus, the first region 41 may be determined to have a value of 1, while the second region 42 may be determined to have a value of 0. Similarly, the third region 43 may be determined to have a value of 0, while the fourth region 44, may be determined to have a value of 1. Thus, the frequency image representation of the fingerprint pattern has a region value pattern or series of 1001.

Using this region value series, the frequency representation of the fingerprint image may be encoded into a spatial image. The region value series may be converted into a spatial representation. Thus, the series of region values that is derived from the frequency domain representation of the original fingerprint image may be represented in the spatial domain. For example, referring again to the extremely simplified frequency representation of FIG. 7, the region value pattern or series may be graphically represented as shown in FIG. 8a.

As noted previously, the frequency image is rotationally symmetric. Thus, the transform pattern below the x-axis would be a mirror image of the image shown above the x-axis in FIG. 7. Thus, if the regional numerical pattern were continued around the full 360 degrees, the pattern would be 10011001. The extended (360 degree) pattern may be graphically shown as in FIG. 8b.

FIG. 9 shows a graphical representation of a pattern or string of binary regional values such as might be determined from a frequency representation divided into a larger number of regions. Of course, each of the regions encompasses a smaller arc of the frequency image plane. This example shows a pattern from a frequency image (half plane) that has been sampled into ten regions. Thus, each region encompasses an arc of 18 degrees. The illustrated pattern is 0100101110. Again, FIG. 9 is a highly simplified example to aid in illustrating aspects of the present invention. The series of values represented in FIG. 9 is not related to the simplified frequency domain image shown in FIG. 7.

FIG. 10 shows a graphical (spatial) representation of a pattern or string of regional values, each of which may have one of four values. Each regional value represents the amount of energy (total energy) in a region of the frequency representation of the fingerprint image. The total energy may be determined by summing the magnitudes of all the energy peaks in the region. Using more than two values for each region allows a finer degree of discrimination as to the concentration of energy peaks in each region. Again, an example is shown of a pattern for a transform half plane that has been divided into ten 18 degree regions. The illustrated pattern in FIG. 10 is 2133100232.

Comparison

The numerical pattern or series of region values obtained from the frequency image of the fingerprint pattern may then be compared with the numerical representations of exemplary or representative frequency images, each representing a particular fingerprint category. This comparison may be performed by the comparator 28 (see FIG. 1).

Each stored numerical pattern corresponds to a representative exemplary fingerprint pattern for the particular category. Thus, referring again to the simplified example of FIGS. 7 and 8, one category of fingerprints might be represented by the regional value 1001, while another category may be represented by the pattern 0110.

The one dimensional transform of the numerical pattern of the unknown fingerprint may then be compared against each of the numerical series of regional values of the representative patterns to establish a "best fit." By way of illustration, the spatial pattern shown in FIG. 8 may be compared with the patterns stored in a library of reference patterns. Each of the patterns stored in the library represents a particular category of fingerprint patterns.

This library of reference numerical patterns may be generated in any of a number of fashions. One technique is to identify the representative fingerprint of a category. The frequency image of that representative fingerprint pattern can then be taken. The frequency image plane may then be divided into the same regions that will be used in examining the unknown pattern, and regional samples from the developed frequency representation may be taken by examining each region of the frequency image plane. The resulting series or pattern of regional values may be stored as the representative pattern for the category.

Alternatively, a collection of fingerprints of the identified category may be analyzed by performing the frequency image conversion or transformation on each of the fingerprint images of the identified category. A pattern of regional values for each of the frequency images may be identified, and the most common series of regional values for that set of fingerprints may be determined. That most common series or pattern of values may be stored as the representative pattern for the category.

Thus, in accordance with the present invention, rather than comparing the frequency representation of the unknown fingerprint image directly with a stored frequency representation of a fingerprint image to identify the unknown fingerprint image, the numerical pattern established by segmenting or sampling the transform is compared with a representative numerical pattern.

As is understood by those familiar with image and numerical processing, the comparison of the regional value series or numerical patterns may be made by multiplying the numerical pattern of the unknown image (the image to be categorized) with each of the representative numerical patterns stored in the library. The greater the degree of identity between the patterns being multiplied, the higher the product of the multiplication.

It may now be recognized that the spatial representation of the series of regional values is a relatively simple two dimensional spatial image. That spatial image was created from the frequency representation of the original fingerprint image. Thus, a simple spatial image has been created that is representative of the unknown fingerprint image.

Similarly, each of the stored region value patterns that represent the different fingerprint categories may be graphically represented in the spatial domain. Such spatial representations resemble the representations shown in FIGS. 8–10.

As is also well understood by those familiar with image processing, a desirable method of comparing two spatial images is to perform a correlation function using the one dimensional frequency representations of the spatial images that represent the numerical patterns. Such a correlation function is equivalent to multiplying the patterns or numerical series for every possible position or the two series as one of the series is slipped over the other. Thus, the patterns may be compared by performing a correlation between the one dimensional frequency representation of the numerical pattern derived from the Fourier transform of the unknown fingerprint and the one dimensional frequency representations representative of the numerical patterns stored in the reference library.

The one dimensional frequency representation of the spatial representation of the region values may be obtained using the Fourier transform function. Such conversion is well understood by those familiar with automated image processing.

Since the image may be rotated relative to the stored reference patterns it is necessary to compare the representations for all possible rotations. This can be accomplished by appending the unknown input representation to itself, forming a sequence twice as long as the original representation. By correlating this augmented sequence with the stored reference sequences the best match can still be identified independent of rotation. Thus, the process will correctly classify the fingerprint image even if its correct rotational orientation is not known. This can be particularly valuable when attempting to identify partial fingerprints in which it is not clear what the rotational orientation of the fingerprint image is.

As is known by those familiar with the Fourier transform arts, a sampled, band limited Fourier transform (which holds for any finite sequence of samples) automatically generates the augmented unknown input sequence, forming a "wrap-around" universe where the beginning of the sequence "connects" to the end of the same sequence (actually the sequence is replicated out to infinity in both directions). For most applications sequences are modified to eliminate this "wrap around" effect prior to Fourier transform processing, but for the present device and method, it simplifies the matching processing. Thus the Fourier transform based correlation process matches a pattern against the reference, shifts the pattern, matches again, and shifts, and so forth. Every position of the pattern, at all rotations, is compared against the reference pattern. Thus, a Fourier transform based correlation function may be applied to match patterns that may be rotationally offset. The correlation may be performed by a Fourier transform correlator. The Fourier transform processor may be optical or digital. Optical Fourier transform processors compare the unknown pattern of regional values with the reference patterns of regional values at high speed. A digital Fast Fourier Transform (FFT) processor may also be used to perform a series of comparisons.

The correlation between the pattern of regional values for the unknown fingerprint pattern and the reference patterns may be performed optically using an optical Vander Lugt correlator. Vander Lugt correlators are well understood in the art. Vander Lugt correlators are described in Vander Lugt, Anthony, *Optical Signal Processing* (Wiley, N.Y.) (ISDN 0-471-54682-8).

Figure 11:
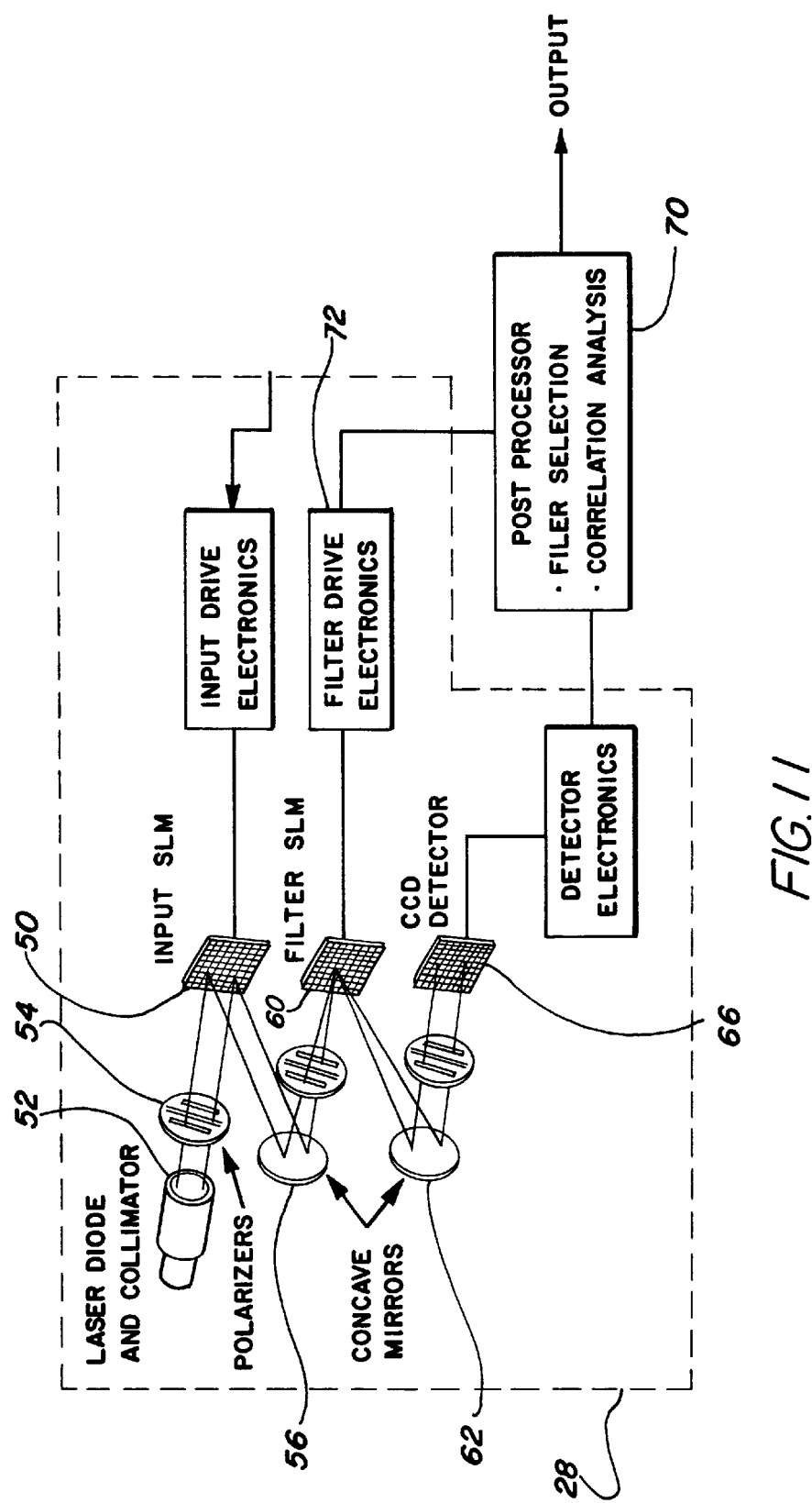
FIG. 11 is a block diagram of an optical correlator such as may be used in conjunction with the present invention.

A simplified block diagram of an optical correlator that may be used as the comparator 28 is shown in FIG. 11. The input image of the series of regional values is patterned onto a uniform coherent light beam by an input spatial light modulator (SLM) 50. The input spatial light modulator 50 is a device that can vary the light intensity as a function of position. A laser diode and collimator 52 supplies the light. The light from the laser diode 52 is polarized by a polarizer 54.

The patterned light from the input SLM 50 is reflected by a curved, concave, mirror 56 that converts the pattern into its spatial frequency components. Those familiar with the art will appreciate that a curved mirror naturally and instantaneously performs a 2-dimensional frequency image transformation. The resulting frequency representation of the numerical pattern is then multiplied, point-by-point, by a filter spatial light modulator 60 that is patterned with a filter. That filter is a matched filter of a known representative numerical series for a category of fingerprint patterns. That pattern is then reflected by a second curved, concave, mirror 62, returning the pattern to the spatial domain. The light reflected by the mirrors 56, 62 passes through polarizers 58, 64.

The spatial pattern from the second mirror 62 is detected by a 2-dimensional imaging sensor, such as an array of charge coupled devices (a CCD array) 66. The pattern at the CCD plane is the mathematical correlation of the unknown input value series or pattern applied to the input SLM 50 and the known pattern of the filter plane applied to the filter SLM 60. The light intensity of the peaks at the correlation (CCD) plane is proportional to the degree of match. Detector electronics 68 read the data from the detectors of the CCD array 66.

A post processor 70 may provide the evaluation of the correlation plane, the selection of filters to use, and outputs the data. The correlator 28 provides raw correlation plane outputs. The post processor 70 selects areas where the light peaks are located in the correlation plane. The post processor compares the correlation intensity with the expected correlation intensity of a perfect match, thus obtaining a confidence level. The post processor 70 then may select a new filter to apply to the filter SLM 60, based on the results of previous filters. The selection and application of the filters for the filter SLM 60 is performed through filter drive electronics 72. The post processor 70 also outputs the results of the pattern recognition task. The post processor 70 is generally the same as the category analysis computer 30.

An exemplary spatial light modulator such as may be used for the SLM 50 is shown in U.S. Pat. No. 5,386,313 (Szegedi et al.), which is assigned to the same assignee as the present invention. An optical correlator that can be beneficially used in implementing the present invention is described in U.S. Pat. No. 5,311,359 (Lucas et al.), which is also assigned to the same assignee as the present invention, and is hereby incorporated herein by reference. An additional description of an optical correlator is found in U.S. Pat. No. 5,452,137 (Lucas), also assigned to the same assignee as the present invention.

Alternatively, a conventional digital computer may be used to perform the correlation function. The digital computer may use generally available software for performing an FFT correlation function.

Conclusion

The apparatus and process described above generates a frequency representation of the fingerprint image. The frequency representation is then divided into regions, and the energy in each region of the frequency representation is quantified to generate a series of region values. The series of region values may then be expressed graphically in the spatial domain. That spatial representation of the fingerprint image may then be compared with stored information to identify a "best fit" category into which the fingerprint image may be placed. By generating relatively simple images to compare, the apparatus and method permits use of conventional image processing and comparison techniques. This allows practical automatic comparison of complex images such as fingerprints.

The transformation of the fingerprint image into its frequency representation eliminates the need to correctly identify the exact x-y position of the fingerprint pattern image. This elimination of x-y sensitivity arises because of the examination of patterns, rather than individual features of the fingerprint image.

As discussed above, the rotational symmetry of the transform image renders the process of the invention insensitive to rotational variation of the fingerprint patterns.

As also discussed above, the comparison process is immune to changes in the size of the original fingerprint image. Different size images may be compared. The angular orientation of the ridges remains the same, regardless of the size of the image. The energy peaks of the frequency representation will remain in the same arc as the fingerprint image is enlarged or reduced.

In addition, the comparison is immune to variations in the fingerprint due to different pressure on application are eliminated using the angular regions in the transform plane. Different pressures used in making a fingerprint cause the ridges to spread apart, which simply moves the transform points closer or farther away from the origin of the transform plane. But the angular orientation of the ridges is not generally significantly affected. Therefore, the transform points for two fingerprints taken from the same finger, but with different pressure, appear in the same angular region.

Once the fingerprint pattern to be identified has been placed into a category using the process and apparatus described above, a more detailed comparison process may be employed to specifically identify the fingerprint pattern. That more detailed process may be either a manual process, or may employ automatic pattern matching techniques.

In many instances, the detailed comparison of fingerprint patterns is best conducted by a skilled human fingerprint technician. The automatic classifier described above places the fingerprint into a category of fingerprints with similar patterns. Those fingerprints are the fingerprints most likely to match the unknown fingerprint pattern. The technician need only compare in detail the unknown fingerprint with other fingerprints that are classified in that category. Thus, the technician has fewer fingerprint patterns requiring detailed comparison. That allows the technician to focus his or her attention on the fingerprints most likely to produce a match. That also reduces the amount of time the technician must spend trying to find a match for a particular fingerprint.

Automatic fingerprint matching techniques also benefit from initial classification of the fingerprint. An automatic fingerprint matching process is more likely to produce a correct match if the matching process is focused on the category of fingerprint patterns most likely to match. In addition, such focus on a smaller number of fingerprint patterns reduces the computational effort required in performing the detailed comparison.

Those skilled in image processing and analysis will recognize that the techniques of the present invention may be used on any image. These techniques are particularly useful for categorizing extremely complex images, such as fingerprints. In addition, those skilled in image processing and analysis art will recognize that various modifications can be made to the preferred embodiment described above. Therefore, the scope of the invention should not be limited to the embodiment described above.

We claim:

1. A method of placing a first unknown image into one of a plurality of categories, the method comprising the steps of:
    taking the frequency image of a first unknown pattern to create a first frequency image;
    dividing the first frequency image into a plurality of frequency image regions;
    assigning a region value to each of the frequency image regions based on frequency image energy in that region;
    combining the region values for the first frequency image to generate a first set of region values; and
    comparing the first set of region values with each of a plurality of value series, each of which value series is representative of the frequency image of an image category.

2. The method of claim 1, wherein the step of comparing the first set of region values with each of a plurality of value series comprises encoding the first set of region values into a spatial image, and correlating that spatial image with spatial images corresponding to each of the plurality of value series.

3. The method of claim 2, wherein the correlating step comprises performing an optical correlation.

4. The method of claim 1, wherein the first image is a first fingerprint image.

5. The method of claim 1, wherein the step of dividing the frequency image comprises dividing the frequency image into fewer than 360 frequency regions.

6. The method of claim 1, wherein each of the frequency regions is larger than a pixel.

7. The method of claim 1, additionally comprising the step of storing the plurality of value series to create a plurality of stored value series, and wherein the step of comparing the first set of region values with a plurality of value series, each of which value series is representative of the frequency image of an image category comprises comparing the first set of region values with each of the stored value series.

8. A method of classifying a fingerprint pattern into one of a plurality of categories, the method comprising:
    taking a two dimensional frequency representation of the fingerprint pattern;
    generating a series of region values for the frequency representation, the generating step comprising the steps of:
        dividing the frequency representation into fewer than 360 regions,
        assigning a region value to each of the regions of the frequency representation; and
        combining the region values to generate a series of region values;
    converting the series of region values into a spatial representation thereof; and
    correlating the spatial representation with a plurality of stored spatial representations, the stored representations being related to a representative fingerprint pattern for one of the plurality of categories.

9. The method of claim 8, wherein the step of comparing the generated spatial representation with a plurality of stored spatial representations comprises correlating the generated spatial representation with a plurality of stored spatial representations.

10. The method of claim 9, wherein the step of correlating the generated spatial representation with a plurality of stored spatial representations comprises optically correlating the generated spatial representation with a plurality of stored spatial representations.

11. A method of placing a first unknown fingerprint into one of a plurality of categories, the method comprising:

creating a plurality of representations of fingerprints, each of which is representative of a fingerprint category, wherein the step of creating comprises, for each of a plurality of representative fingerprints, the steps of:

taking a two dimensional frequency image of a representative fingerprint for each fingerprint category;

dividing of the frequency image into a plurality of regions;

assigning a region value to each of the image regions based on energy present in the frequency image in that region; and combining the region values to generate a fingerprint value series;

taking a two dimensional frequency image of a first unknown fingerprint to create a first unknown frequency image;

dividing the first unknown frequency image into a plurality of unknown image regions;

assigning a region value to each of the unknown image regions based on energy present in the first unknown frequency image in that region;

combining the region values for the first unknown frequency image to generate a first unknown fingerprint value series; and comparing the first unknown fingerprint value series with each of the fingerprint value series representative of the different fingerprint categories.

12. The method of claim 11, wherein the step of comparing the first unknown fingerprint value series with each of the fingerprint value series representative of the different fingerprint categories that represent the different categories comprises convolving the one dimensional Frequency image of the first unknown fingerprint value series with the one dimensional Frequency image of each of the fingerprint value series representative of the different fingerprint categories.

13. The method of claim 11, wherein:

the step of creating a plurality of representations of fingerprints additionally comprises, for each of the plurality of representative fingerprints, the step of generating a representation of the fingerprint value series;

the method additionally comprises the step of generating a representation of the first unknown fingerprint value series; and the step of comparing the first unknown fingerprint value series with each of the fingerprint value series representative of the different fingerprint categories comprises correlating the representation of the first unknown fingerprint value series with each of the representations of the fingerprint value series representative of the different fingerprint categories.

14. The method of claim 11, wherein the step of comparing the generated representation with each of the stored representations representative of the different fingerprint categories comprises optically comparing the generated spatial representation with a plurality of stored spatial representations.

15. An apparatus for placing a first unknown image into one of a plurality of categories, the apparatus comprising:

a library for storing a plurality of value series, each of which series is representative of the frequency image of an image category;

frequency image apparatus for taking the frequency image of a first unknown pattern to create a first frequency image;

sampling apparatus for dividing the first frequency image into a plurality of frequency image regions, wherein the sampling apparatus additionally assigns a region value to each of the frequency image regions based on energy present in that region of the frequency image, and combines the region values for the first frequency image to generate a first series of region values; and a comparator for comparing the first series of region values with each of the stored value series.

16. The apparatus of claim 15, wherein the sampling apparatus divides the frequency image into fewer than 360 frequency image regions.

17. The apparatus of claim 15, wherein the comparator comprises a correlator for:

generating a spatial representation of the first series of region values; and correlating the generated spatial representation with a spatial representation of one or more value series stored in the library.

* * * * *